United States Patent
Chao et al.

(10) Patent No.: US 12,147,596 B1
(45) Date of Patent: Nov. 19, 2024

(54) EVENT SENSING AND TRACKING

(71) Applicant: Meta Platforms Technologies, LLC, Menlo Park, CA (US)

(72) Inventors: Qing Chao, Redmond, WA (US); Robert Dale Cavin, Bellevue, WA (US); Guillaume Lestoquoy, Mountain View, CA (US); Mohammadhossein Daraeihajitooei, Seattle, WA (US); Xinqiao Liu, Medina, WA (US); Raffaele Capoccia, Zürich (CH); Sascha Hallstein, Saratoga, CA (US); Ziyun Li, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/896,679

(22) Filed: Aug. 26, 2022

(51) Int. Cl.
| | | |
|---|---|---|
| *G06F 3/01* | (2006.01) | |
| *G06T 7/73* | (2017.01) | |
| *G06V 10/25* | (2022.01) | |
| *G06V 10/60* | (2022.01) | |
| *G06V 40/18* | (2022.01) | |
| *H04N 5/33* | (2023.01) | |

(52) U.S. Cl.
CPC .............. *G06F 3/013* (2013.01); *G06T 7/73* (2017.01); *G06V 10/25* (2022.01); *G06V 10/60* (2022.01); *G06V 40/193* (2022.01); *H04N 5/33* (2013.01); *G06T 2207/10048* (2013.01); *G06T 2207/30201* (2013.01)

(58) Field of Classification Search
CPC . G06F 3/013; G06T 7/73; G06T 2207/10048; G06T 2207/30201; G06V 10/25; G06V 10/60; G06V 40/193; H04N 5/33
See application file for complete search history.

(56) References Cited

U.S. PATENT DOCUMENTS

| | | |
|---|---|---|
| 10,108,261 B1 | 10/2018 | Hall et al. |
| 10,466,779 B1 | 11/2019 | Liu |
| 2020/0278539 A1* | 9/2020 | Petljanski .......... G02B 27/0101 |
| 2021/0173474 A1* | 6/2021 | Sztuk .................... G06T 19/006 |
| 2022/0003994 A1 | 1/2022 | Petljanski et al. |
| 2022/0050292 A1 | 2/2022 | Amirsolaimani et al. |

FOREIGN PATENT DOCUMENTS

WO  WO-2017031089 A1 *  2/2017  ............. A61B 3/113

OTHER PUBLICATIONS

Angelopoulos A.N., et al., "Event Based, Near Eye Gaze Tracking Beyond 10,000 Hz," IEEE Transactions on Visualization and Computer Graphics, Feb. 5, 2021, 12 pages.
Stoffregen T., et al., "Event-Based Kilohertz Eye Tracking using Coded Differential Lighting," Proceedings of the IEEE/CVF Winter Conference on Applications of Computer Vision (WACV), 2022, pp. 2515-2523.

* cited by examiner

*Primary Examiner* — Abhishek Sarma
(74) *Attorney, Agent, or Firm* — Freestone Intellectual Property Law PLLC; Aaron J. Visbeek

(57) ABSTRACT

An eyebox region is illuminated with a fringe illumination pattern. An event sensor is configured to generate event-signals. Eye motion is determined from the event-signals. Eye-features are extracted from data generated by the event sensors and a predicted gaze vector is generated from the eye-features.

17 Claims, 12 Drawing Sheets

EVENT SENSING AND TRACKING

TECHNICAL FIELD

This disclosure relates generally to optics, and in particular to event sensing.

BACKGROUND INFORMATION

A variety of techniques for tracking by way of depth sensing have been developed by different industries. For example, one stereo triangulation technique includes imaging an object with two different cameras and determining a distance to the object using corresponding points in the images from the two cameras. Time of Flight (TOF) is another existing technique that may include transmitting laser pulses and measuring the time of flight between the transmitted and reflected laser pulse to calculate the depth of an object that reflected the laser pulse.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
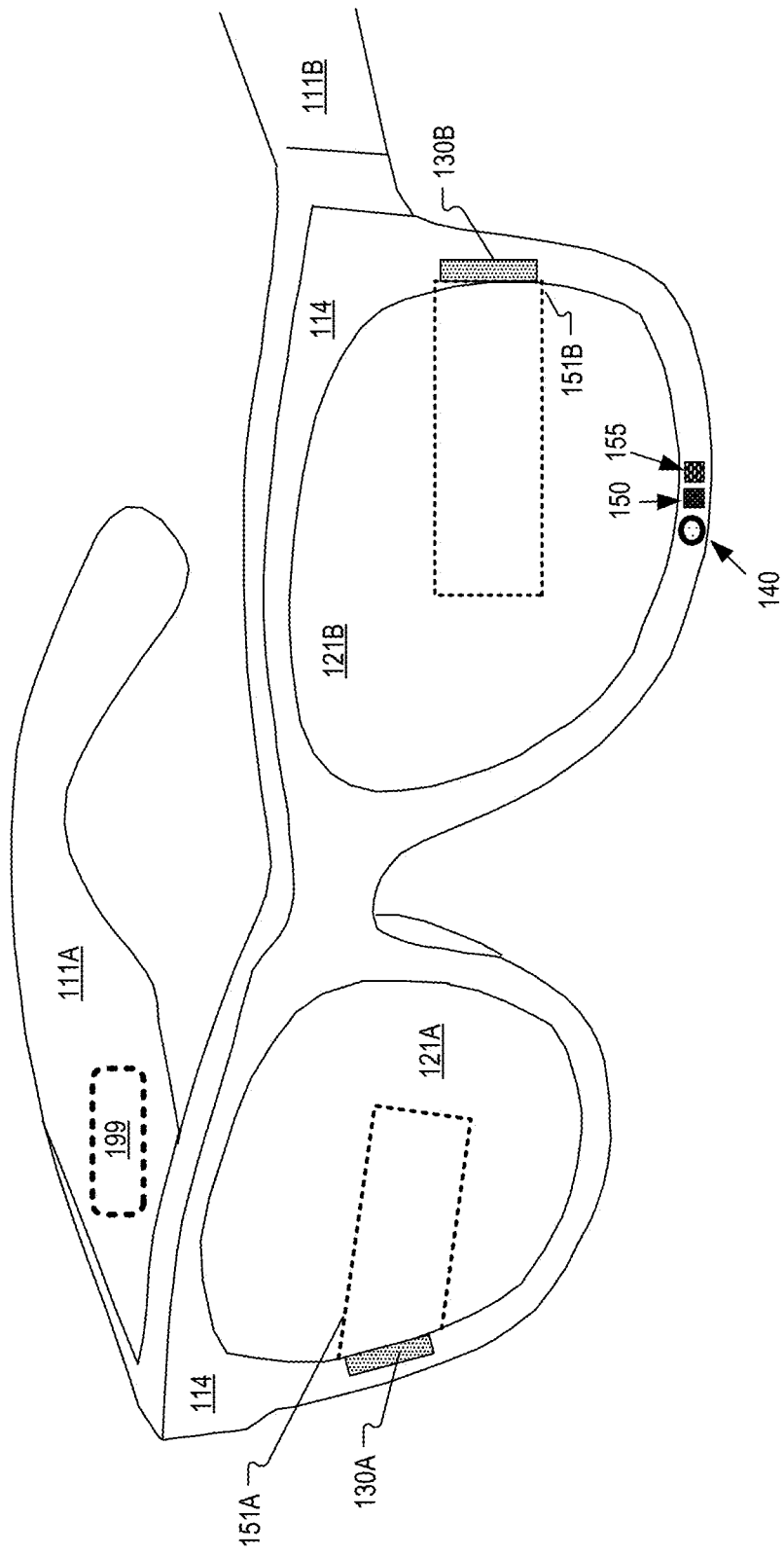
FIGS. 1A-1B illustrate example head mounted devices that include an event sensor for eye-tracking, in accordance with aspects of the disclosure.

Embodiments of event sensing and tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

It is desirable to have high performance, low power, and/or high accuracy tracking for a variety of contexts. In a virtual reality (VR) or augmented reality (AR) contexts, the tracking/sensing may be used for eye-tracking, hand tracking, or otherwise. Event sensors are used for tracking contexts, although they don't provide the accuracy of three-dimensional (3D) depth sensing that utilizes traditional image sensors. While 3D depth sensing may have high accuracy, the tracking speed may be limited to a maximum frame rate of an image sensor and the ability to quickly process the image frames generated by the image sensor.

In implementations of the disclosure, a predicted gaze vector is generated when event-signals from an event sensor indicate enough eye motion to reach a threshold. The predicted gaze vector may be used to drive a display of a head mounted display (HMD). The display may be driven to present virtual images to a particular eyebox location, for example. A novel event sensor may be included in a tracking system. The event sensor may include event-sensing logic to generate event signals and region-of-interest (ROI) logic configured to identify an ROI of imaging pixels from a spatial concentration of event signals in the ROI. Once the ROI is identified, the event sensor may be driven to capture an image frame of just the imaging pixels in the ROI (while not driving the imaging pixels outside the ROI to capture an image). These and other embodiments are described in more detail in connection with FIGS. 1A-7C.

FIG. 1A illustrates an example head mounted device 100 that includes an event sensor for eye-tracking, in accordance with implementations of the disclosure. Head mounted device 100 includes frame 114 coupled to arms 111A and 111B. Lenses 121A and 121B (collectively referred to as lenses 121) are mounted to frame 114. Lenses 121 may be prescription lenses matched to a particular wearer of the head mounted device 100 or non-prescription lenses. The illustrated head mounted device 100 is configured to be worn on or about a head of a user.

In FIG. 1A, each lens 121 includes a waveguide 151 to direct image light generated by a display 130 to an eyebox region for viewing by a wearer of head mounted device 100. Display 130 may include an LCD, an organic light emitting diode (OLED) display, micro-LED display, quantum dot display, pico-projector, or liquid crystal on silicon (LCOS) display for directing image light to a wearer of the head mounted device 100. The illustrated head mounted device 100 may be referred to as a head mounted display (HMD) since it includes at least one display 130 and waveguide 151 to present virtual images to a user. However, implementations of the disclosure may be utilized in head mounted devices (e.g. smartglasses) that don't necessarily include a display.

The frame 114 and arms 111 of the head mounted device 100 may include supporting hardware of head mounted device 100. In the illustrated implementation, head mounted device 100 includes processing logic 199. Head mounted device 100 may include any of wired and/or wireless data interface for sending and receiving data, graphic processors, and one or more memories for storing data and computer-executable instructions. In one embodiment, head mounted device 100 may be configured to receive wired power. In one embodiment, head mounted device 100 is configured to be powered by one or more batteries. In one embodiment, head mounted device 100 may be configured to receive wired data including video data via a wired communication channel. In one embodiment, head mounted device 100 is configured to receive wireless data including video data via a wireless communication channel.

Lenses 121 may appear transparent to a user to facilitate augmented reality or mixed reality where a user can view scene light from the environment around them while also receiving image light directed to their eye(s) by waveguide(s) 151.

The example head mounted device 100 of FIG. 1A includes a fringe illuminator module 140 configured to illuminate an eyebox region with a fringe illumination pattern. The fringe illumination pattern may have a near-infrared wavelength. The fringe illuminator module 140 is disposed on frame 114 and emitting light back toward the eyebox region, in FIG. 1A. In the illustrated implementation of FIG. 1A, fringe illuminator module 140 is positioned at the bottom of frame 114, although it may be positioned in other locations in frame 114 or even within lens 121B. Head mounted device 100 also includes an event sensor 150 having a field-of-view (FOV) that includes the eyebox region so that event sensor 150 can image an eye of a user that occupies the eyebox region. In some implementations, the FOV of event sensor 150 only include a small area of the eyebox region that is expected to include the pupil and/or iris of an eye of the user.

Head mounted device 100 further includes a camera 155. Camera 155 may include a complementary metal-oxide semiconductor (CMOS) image sensor configured to capture image frames of an eyebox region. Camera 155 may utilize a rolling shutter or global shutter to capture the image frames of the eyebox region. Camera 155 may capture 24 frames per second (fps), 30 fps, 60 fps, or 120 fps, for example. Camera 155 may be co-located with event sensor 150 so that camera 155 and event sensor 150 have almost the same point of view. Co-locating event sensor 150 with camera 155 may include positioning them adjacent to each other and placing them as close together as manufacturing tolerances will allow.

Although not particularly illustrated, the right side of head mounted device 100 may also include a fringe illuminator module 140, event sensor 150, and camera 155 to perform eye-tracking for the right eye of a user of the head mounted device 100.

Figure 1B:
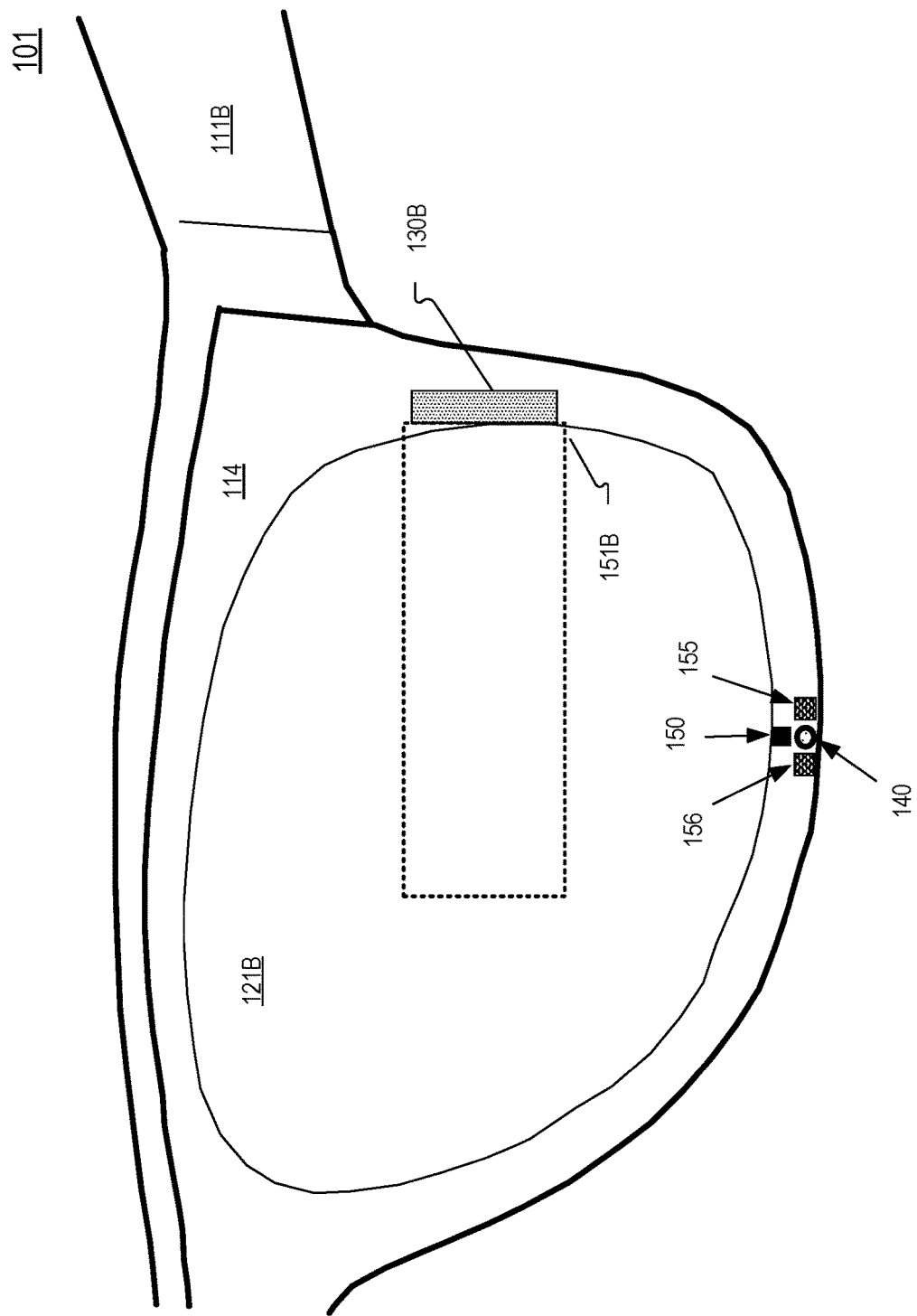

FIG. 1B illustrates a zoomed-in view of a portion of an example head mounted device 101 that includes cameras 155 and 156 disposed around fringe illuminator module 140, in accordance with aspects of the disclosure. Having two cameras 155 and 156 may provide imaging of a better eye movement range. In an implementation, cameras 155 and 156 are disposed symmetrically around fringe illuminator module 140. Camera 156 may be configured the same or similarly to camera 155. In the illustration of FIG. 1B, event sensor 150 is disposed equidistant from camera 155 and 156.

Although not particularly illustrated, the right side of head mounted device 101 may also include a fringe illuminator module 140, event sensor 150, and cameras 155 and 156 to perform eye-tracking for the right eye of a user of the head mounted device 100

Figure 1C:
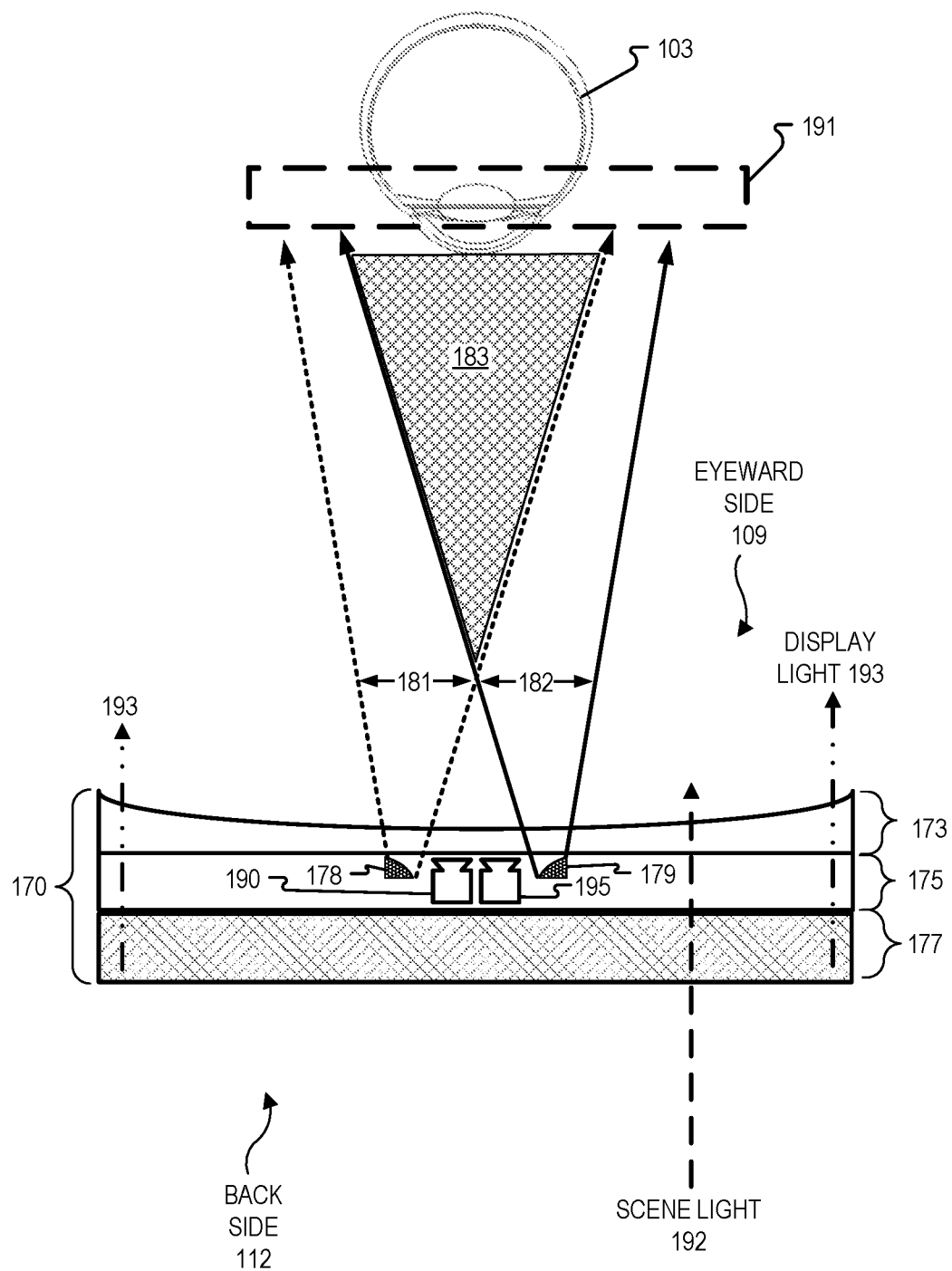
FIG. 1C illustrates a top view of a near-eye optical element and illuminators for generating a fringe illumination pattern, in accordance with aspects of the disclosure.

FIG. 1C illustrates a top view of a near-eye optical element 170 and illuminators 178 and 179 for generating a fringe illumination pattern 183, in accordance with implementations of the disclosure. Near-eye optical element 170 may be used as lens 121A or 121B in FIG. 1A, for example. The illustrated near-eye optical element 170 includes an optional lens layer 173, a transparent layer 175, and a display layer 177. Display layer 177 may include a waveguide to direct virtual images in display light 193 toward an eyeward side 109 of near-eye optical element 170 toward eyebox region 191. At least a portion of scene light 192 from an external environment may propagate from a backside 112 of near-eye optical element 170 through near-eye optical element 170 to eyebox region 191. Thus, eye 103 may view display light 193 overlaying scene light 192.

Illuminators 178 and 179 may be included in fringe illuminator module 140. Illuminators 178 and 179 may be disposed on a frame 114 of head mounted device or may be included in lenses 121. Illuminator 178 emits beam 181 and illuminator 179 emits beam 182 that interferes with beam 181 to generate fringe illumination pattern 183 that illuminates eyebox region 191. Beam 181 may be coherent light and beam 182 may also be coherent light. Beams 181 and 182 may be expanding beams having a cone shape beam. Illuminators 178 and 179 may include a coherent light source or may be exit ports of fiber optics included in a photonic integrated circuit (PIC). The light source may be an LED, a vertical-cavity surface-emitting laser (VCSEL), or otherwise. Beams 181 and light 182 may be a same wavelength. Beams 181 and light 182 may be narrow-band near-infrared light having a linewidth of less than 1 nm. Illuminators 178 and 179 may be positioned much closer together than illustrated in FIG. 1C. FIG. 1C illustrates that event sensor 190 and camera 195 are co-located and both sensors are configured to image eyebox region 191.

Figure 2A:
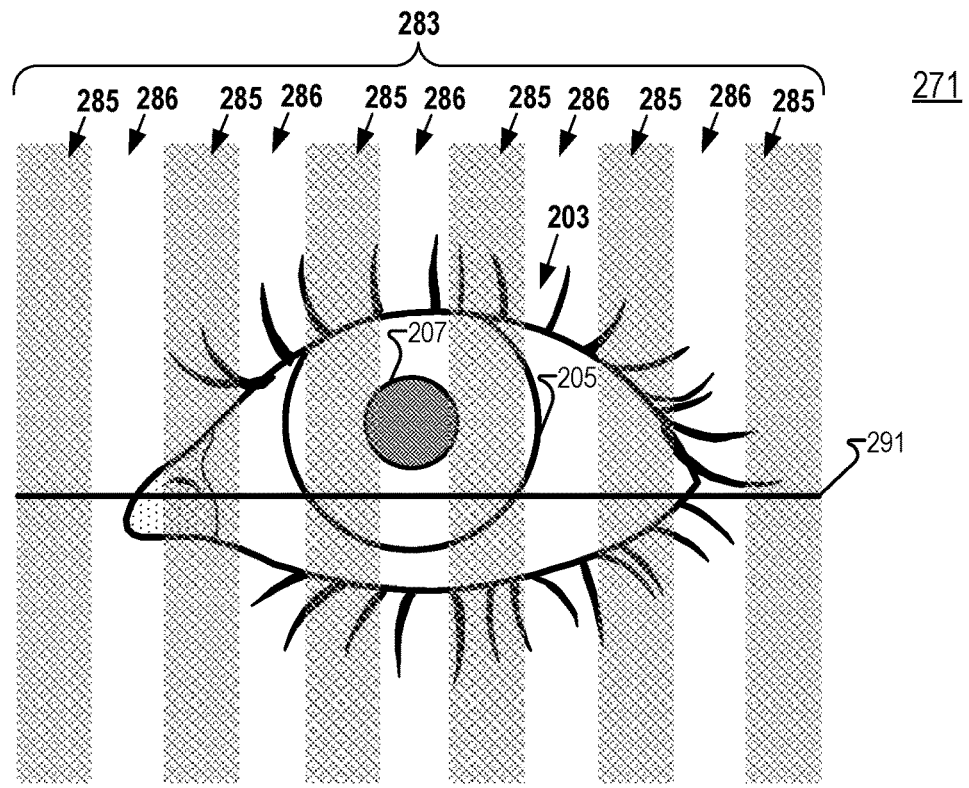
FIGS. 2A-2B illustrate an eye illuminated with an example fringe illumination pattern, in accordance with aspects of the disclosure.
Figure 2B:
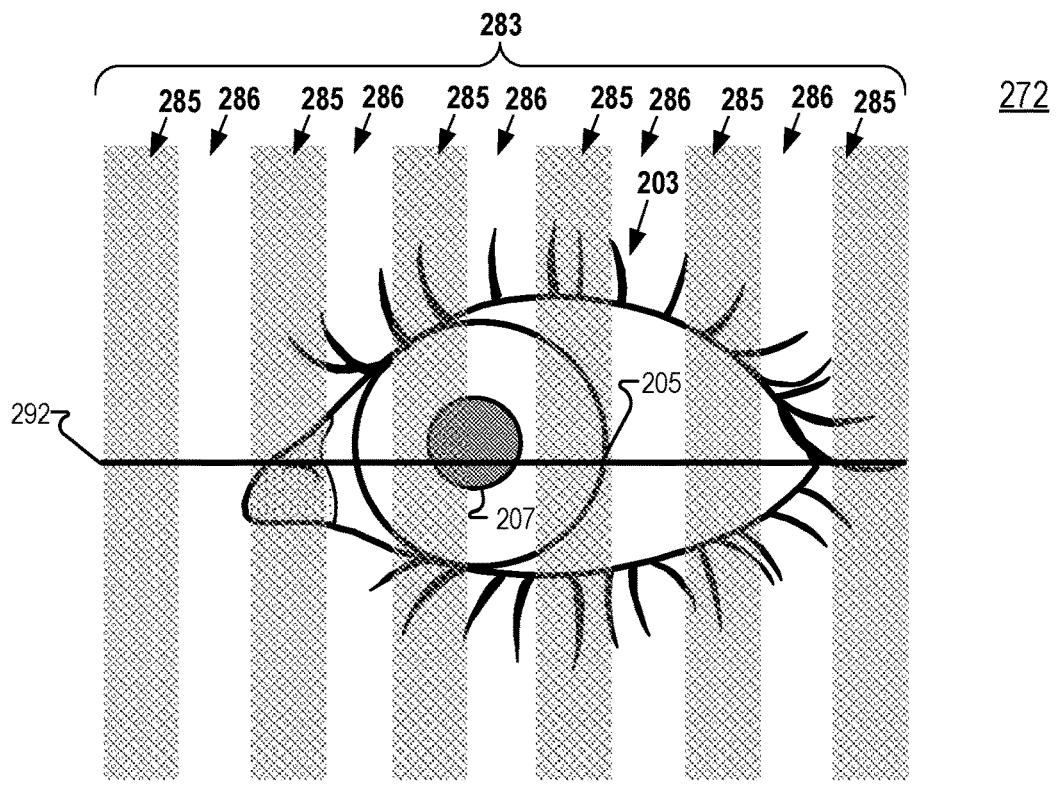

FIGS. 2A-2B illustrate an eye 203 illuminated with an example fringe illumination pattern 283, in accordance with implementations of the disclosure. Example fringe illumination pattern 283 includes bright fringe strips 286 alternating with dark fringe strips 285. Eye 203 includes a pupil 207 surrounded by iris 205. FIG. 2A shows an image 271 of an up gaze of eye 203 at a first time period and FIG. 2B illustrates an image 272 of a left gaze of eye 203 at a second time period.

Figure 3A:
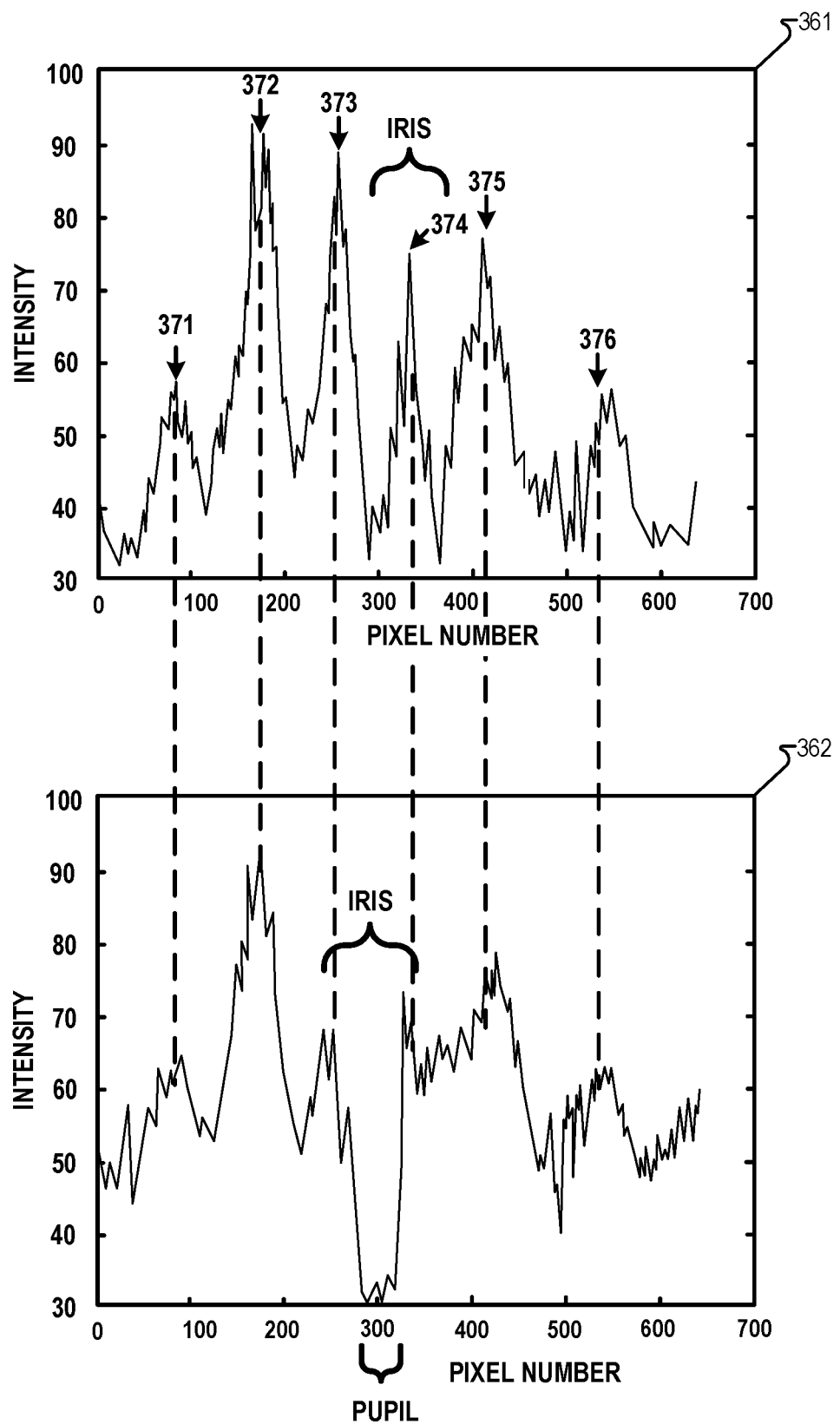
FIG. 3A illustrates a light intensity plot along an image scan line of FIG. 2A and a light intensity plot along an image scan line of FIG. 2B, in accordance with aspects of the disclosure.

FIG. 3A illustrates a light intensity plot 361 along image scan line 291 of FIG. 2A and a light intensity plot 362 along image scan line 292 of FIG. 2B, in accordance with aspects of the disclosure. Light intensity plot 361 illustrates fringes 371, 372, 373, 374, 375, and 376 that correspond with the bright portions of fringe illumination pattern 283 of FIG. 2A along scan line 291. Iris 205 is positioned in fringe 374 between pixels 300 and 400 of image scan line 291 of a first image captured at the first time period where eye 203 is gazing upward.

Light intensity plot 362 shows that iris 205 has changed position in the second image captured at a second time period where eye 203 is left gazing. In light intensity plot 362, the position of the iris 205 has shifted toward pixel number 300 in image scan line 292. Notably, intensity plot 362 illustrates a steep drop in light intensity near pixel 300 that indicates the position of pupil 207 in image scan line 292. The intensity of pupil 207 tends to have the lowest intensity of features of eye 203 since light passes through pupil 207 rather than reflecting a significant portion of light such as iris 205. Hence, pupil 207 can be identified in intensity plot 362 and hence the location of the iris surrounding the pupil can also be identified. Intensity plot 361 does not include a steep drop in light intensity compared to intensity plot 362 because image scan line 291 does not run through pupil 207, in FIG. 2A.

Figure 3B:
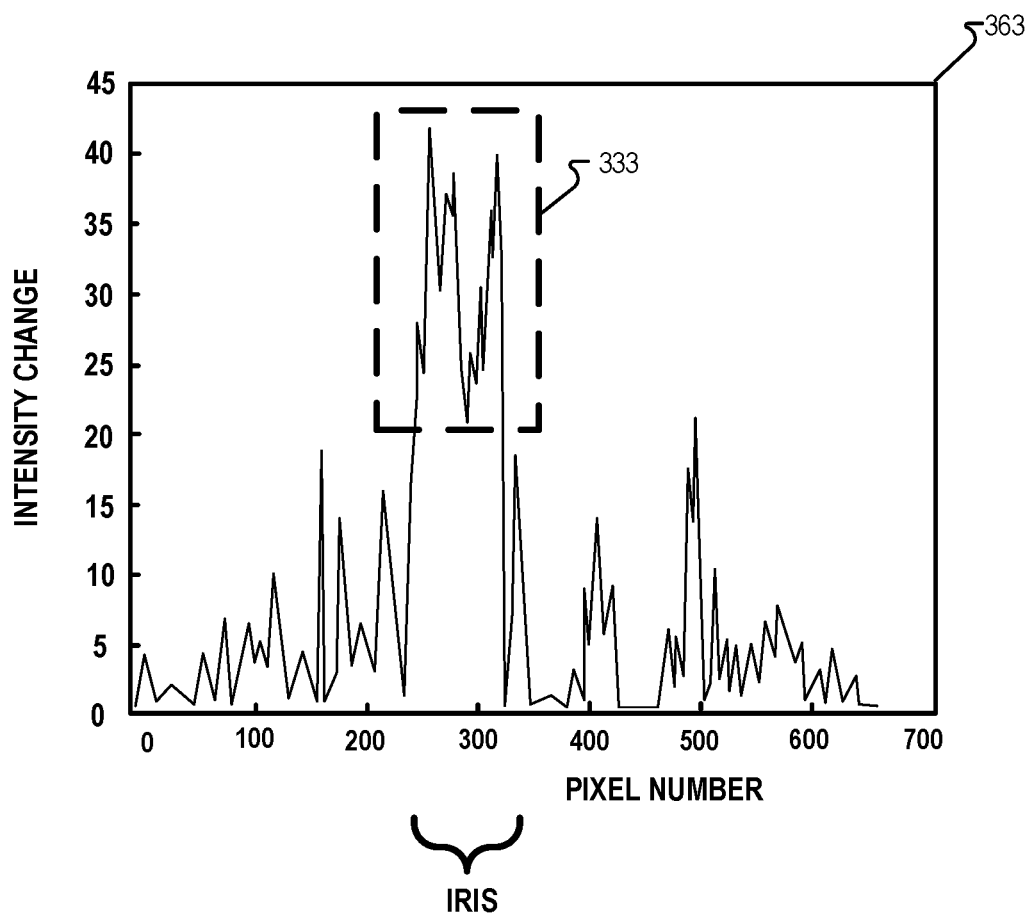
FIG. 3B illustrates a light intensity plot that includes intensity difference data between the images of FIGS. 2A and 2B, in accordance with aspects of the disclosure.

FIG. 3B illustrates a light intensity plot 363 that includes intensity difference data between the first image 271 and the second image 272, in accordance with aspects of the disclosure. In the particular illustration of FIG. 3B, light intensity plot 363 is the difference between the intensity difference between image scan lines 291 and 292. In the illustrated implementation, light intensity plot 363 is generated by subtracting a second pixel row of image scan line 292 of image 272 from a first pixel row of image scan line 291 of image 271. Light intensity plot 363 includes an intensity change peak 333 that indicates the location of iris 205. Therefore, eye features of an eye 203 occupying eyebox region 191 can be identified from (or based at least in part from) the intensity change peak 333 of intensity different data of light intensity plot 363.

Figure 4:
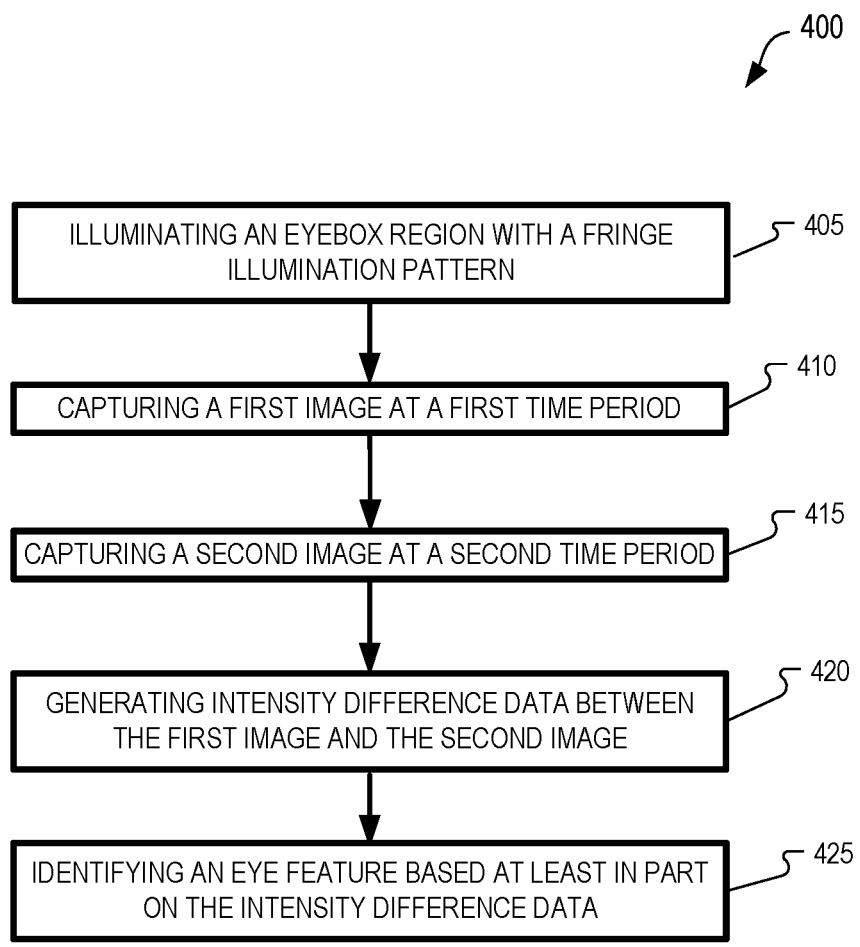
FIG. 4 illustrates a process of identifying eye features where the eye is illuminated with fringe illumination patterns, in accordance with aspects of the disclosure.

FIG. 4 illustrates a process 400 of identifying eye features where the eye is illuminated with fringe illumination patterns, in accordance with implementations of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. In some implementations, processing logic 199 of head mounted device 100 may execute all or a portion of process 400.

In process block 405, an eyebox region (e.g. eyebox region 191) is illuminated with a fringe illumination pattern. The fringe illumination pattern is near-infrared light, in some implementations.

In process block 410, a first image (e.g. image 271) of the eyebox region is captured at a first time period while the eyebox region is illuminated with the fringe illumination pattern.

In process block 415, a second image (e.g. image 272) of the eyebox region is captured at a second time period while the eyebox region is illuminated with the fringe illumination pattern. The second time period may be subsequent to the first time period.

In process block 420, intensity difference data (e.g. light intensity plot 363) between the first image and the second image is generated. Generating the intensity difference data includes subtracting second pixel rows of the second image from first pixel rows of the first image, in some implementations.

In process block 425, an eye feature (e.g. pupil and/or iris) is identified based at least in part on the intensity difference data. Identifying the eye feature includes identifying a pupil or an iris occupying the eyebox region from an intensity change peak (e.g. intensity change peak 333) from the intensity difference data.

Figure 5:
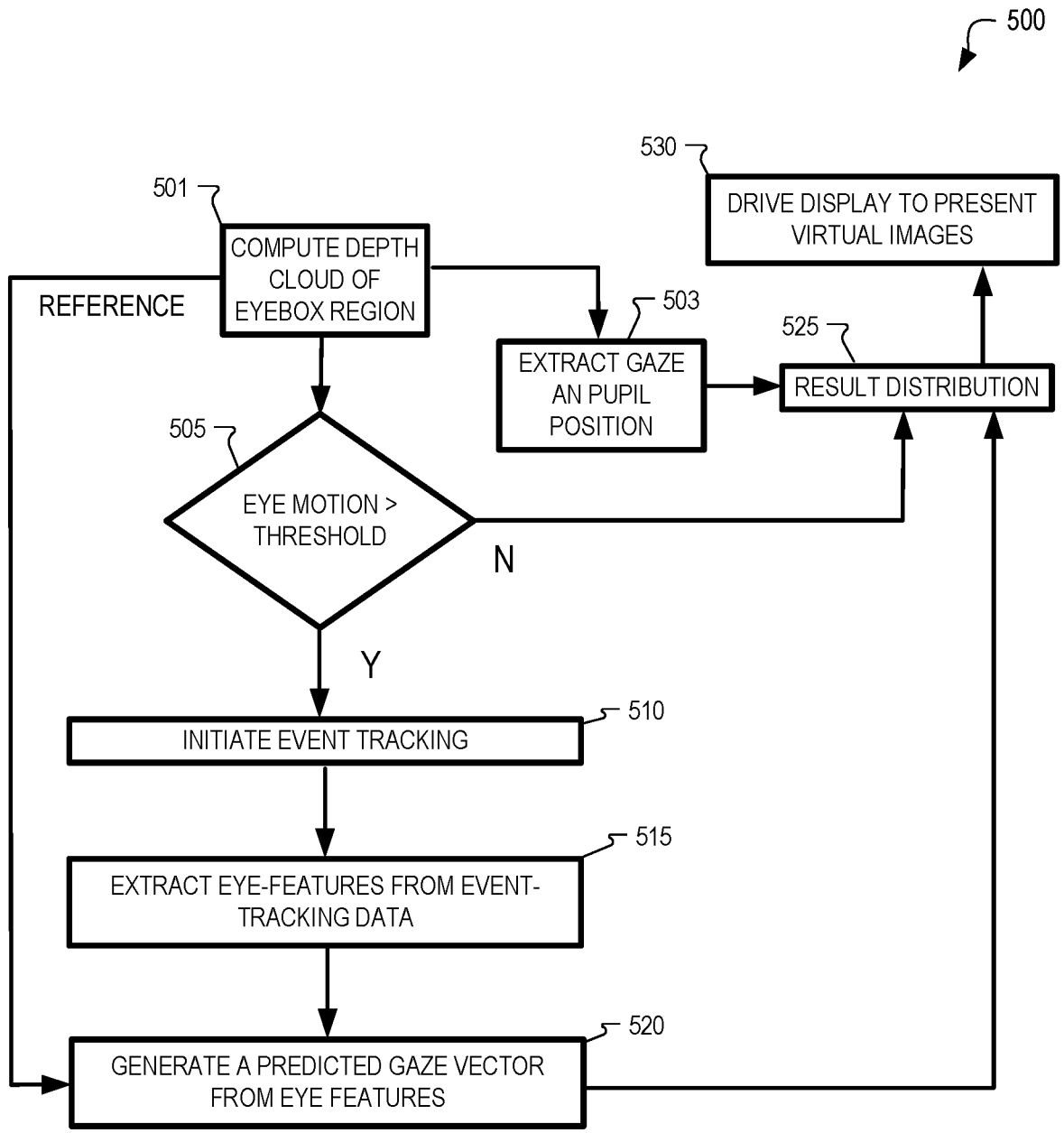
FIG. 5 illustrates a process of predicting a gazed vector of the eye with event sensing, in accordance with aspects of the disclosure.

FIG. 5 illustrates a process 500 of predicting a gaze vector of the eye with event sensing, in accordance with implementations of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. In some implementations, processing logic 199 of head mounted device 100 may execute all or a portion of process 500.

In process block 501, a depth cloud of an eyebox region is computed. Computing the depth cloud may include precise depth information of the coordinates of an eye occupying the eyebox region.

In process block 503, an initial gaze and initial pupil position of the eye is extracted from the depth cloud and provided to a result distribution block 525. Result distribution block 525 may pass eye data such as the initial gaze and initial pupil position to a display so that the display may present virtual images to the eye based on the eye data.

After the depth cloud is computed in process block 501, eye motion of an eye in the eyebox is compared to a threshold in process block 505. The eye motion may be determined by a magnitude of differences in the depth cloud computed in process block 501. The eye motion may be determined from event-signals generated by an event sensor of a head mounted device. The event-signals may be generated by the event sensor while the eyebox region is illuminated by a fringe illumination pattern (e.g. fringe illumination pattern 283). If the eye motion does not reach the threshold, result distribution block 525 may pass eye data received from process block 503 (such as the gaze and pupil position) to process block 530 so that a display of a head mounted display may present virtual images to the eye based on the eye data. For example, the display may present the virtual image(s) to an initial eyebox location corresponding with the initial gaze and an initial pupil position. If the eye motion reaches the threshold in process block 505, process 500 continues to process block 510.

In process block 510, event tracking is initiated. Event tracking may include capturing event-tracking data generated by the event sensor.

In process block 515, eye-features (e.g. pupil and/or iris) are extracted from the event-tracking data.

In process block 520, a predicted gaze vector for the future time is generated from the eye-features. For example, the pupil position of the eye may indicate if the eye is gazing left, right, up, down and where the eye will be gazing in the future based on prior pupil positions. The future time may correspond to a time of a next image capture by a camera of the head mounted device, such as camera 155. The depth cloud computed in process block 501 may be used as a reference in generating the predicted gaze vector in process block 520. The predicted gaze vector is provided to result distribution block 525. Result distribution block 525 may pass the predicted gaze vector to a display so that the display may present virtual images to a particular eyebox location in eyebox region 191 at the future time, based on the predicted gaze vector.

Figure 6:
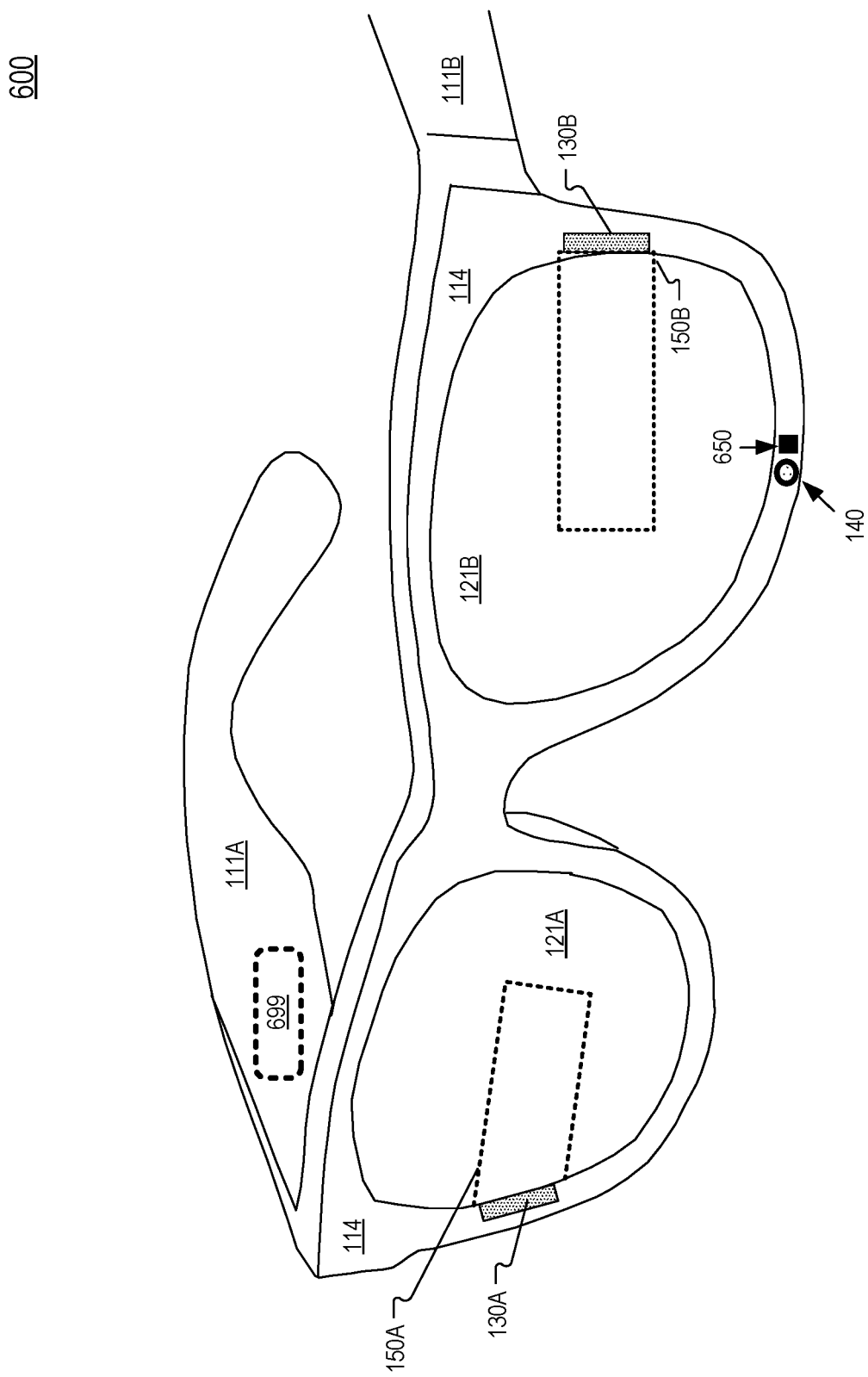
FIG. 6 illustrates a head mounted device including a hybrid event sensing camera, in accordance with aspects of the disclosure.

FIG. 6 illustrates a head mounted device 600 including a hybrid event sensing camera 650, in accordance with implementations of the disclosure. Head mounted device 600 is configured similarly to head mounted device 100 although hybrid event sensing camera 650 is used in head mounted device instead of co-locating event sensor 150 and camera 155. Processing logic 699 of head mounted device 600 may drive fringe illuminator module 140 to illuminate an eyebox region with a fringe illumination pattern and hybrid event sensing camera 650 may image the eyebox region while it is illuminated by the fringe illumination pattern.

Figure 7A:
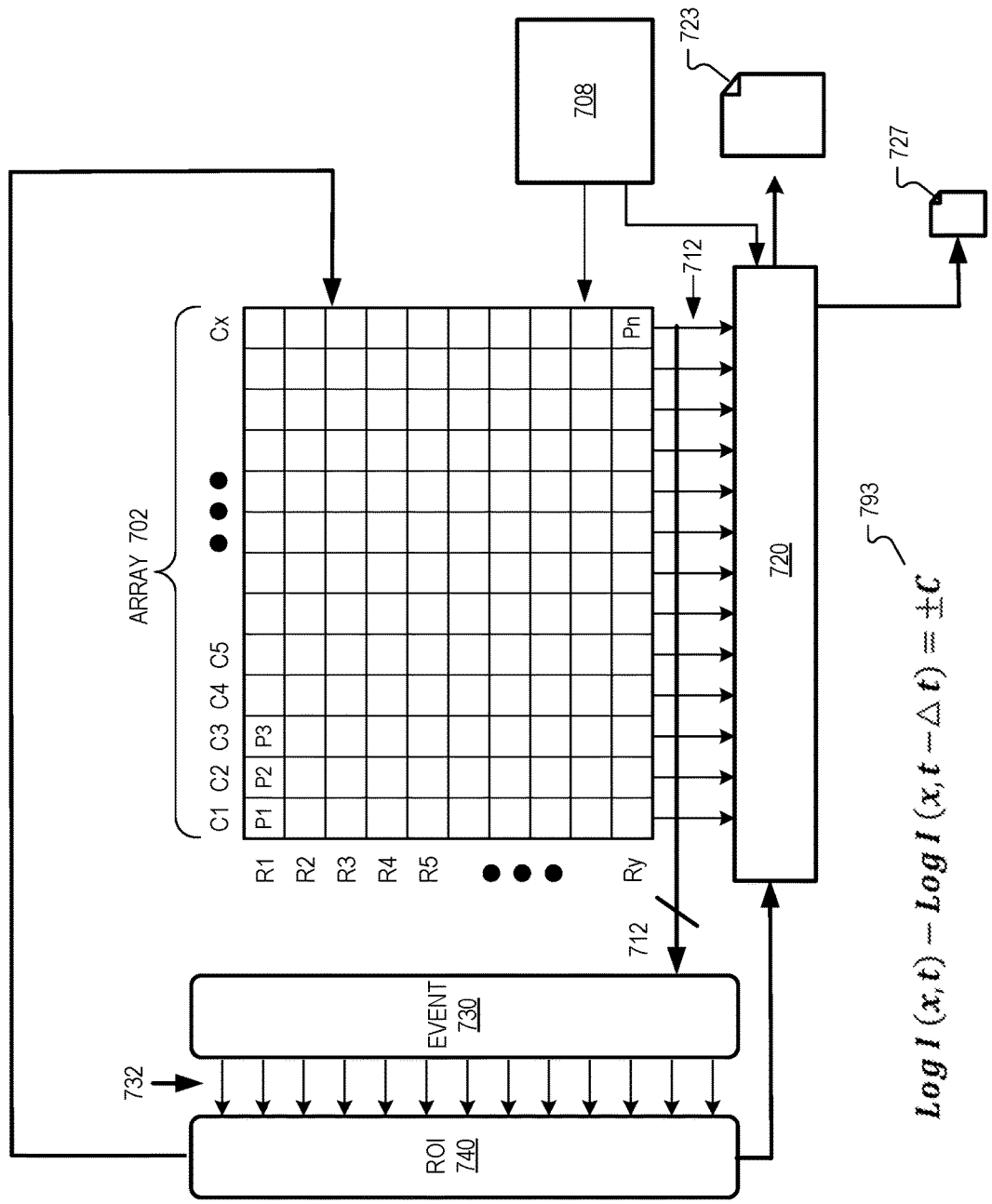
FIG. 7A illustrates a block diagram schematic of a configuration of an example hybrid event sensing camera, in accordance with aspects of the disclosure.

FIG. 7A illustrates a block diagram schematic of a configuration of an example hybrid event sensing camera 700, in accordance with implementations of the disclosure. Hybrid event sensing camera 700 includes an image pixel array 702 including imaging pixels P1, P2, P3 . . . through $P_n$ configured to generate imaging signals 712 in response to incident image light. Image pixel array 702 is arranged in rows and columns and has integer x columns and integer y rows where n is the product of x and y. Image pixel array 702 may include millions of imaging pixels, in some implementations.

In operation, image acquisition logic 708 may drive image pixel array 702 to capture an image frame. The imaging pixels of image pixel array 702 may be configured to sense near-infrared light and reject visible light. An infrared filter that receives a narrow-band near-infrared wavelength may be placed over the image sensor so it is sensitive to the narrow-band near-infrared wavelength while rejecting visible light and wavelengths outside the narrow-band. Imaging pixels in image pixel array 702 may operate to capture full image frame 723 using a global shutter or a rolling shutter, for example. Readout logic 720 receives imaging signals 712 generated by the imaging pixels and generates full image frame 723 from the imaging signals 712. Readout logic 720 may have analog-to-digital circuits (ADCs), amplifiers, and other components included in readout circuitry of convention readout circuits of CMOS image sensors to readout three-transistor (3T) or four-transistor (4T) imaging pixels.

Hybrid event sensing camera 700 may operate as an event sensor where event-sensing logic 730 receives the imaging signals 712 generated by the imaging pixels of image pixel array 702. Event-sensing logic 730 may only receive the imaging signals 712 between captures of full image frames 723. Event-sensing logic 730 generates event signals 732 in response to receiving the imaging signals 712. Event-signals 732 may be generated when the imaging signal is above a positive event-threshold value or below a negative event-threshold value. In an implementation according to equation 793, a positive event signal is generated when a log of an intensity (I) of a particular imaging pixel (x) is above a log of a previous intensity of the same imaging pixel (x) by the positive threshold value (+C). And, a negative event signal is generated when a log of an intensity of a particular imaging pixel is below a log of a previous intensity of the same imaging pixel by the negative threshold value (−C). In some implementations, a logarithmic amplifier, difference logic, and comparators are utilized to electronically execute equation 793 and generate event signals 732. In an implementation, each imaging pixel in imaging pixel array 702 has a corresponding event "pixel" in event-sensing logic 730 that includes integrated circuitry to generate the event signals 732. Event signal 732 are generated asynchronously.

In the illustrated implementation, region-of-interest (ROI) logic 740 is coupled to receive the event signals 732 from event-sensing logic 730. ROI logic 740 may be configured to identify an ROI of the imaging pixels from a spatial concentration of event signals in the ROI within a time period (e.g. 10 microseconds or less) and drive an ROI portion of the imaging pixels (in image pixel array 702) that make up the ROI to capture an ROI image frame 727 that is subset (a smaller image) of a full image frame 723 of image pixel array 702. ROI logic 740 may also control readout logic 720 to only readout the ROI portion of the imaging pixels that make up the ROI in order to speed up the readout process to generate ROI image frame 727. ROI image frame 727 may be generated between a scheduled capture (e.g. 30 fps) of full image frames 723. ROI image frame 727 may be captured with a global shutter or rolling shutter of the ROI portion of the imaging pixels.

Figure 7B:
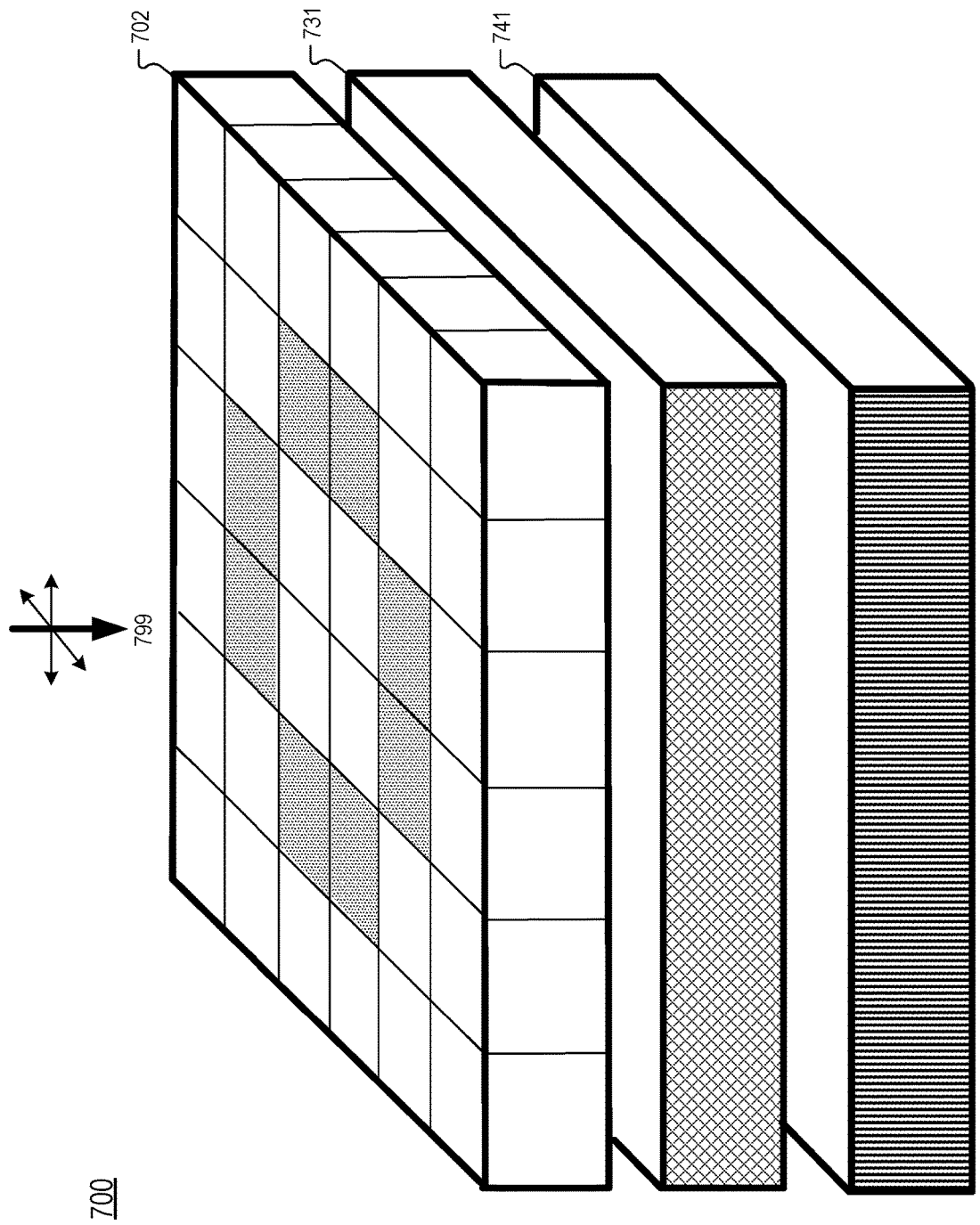
FIG. 7B illustrates an example layer arrangement of the hybrid event sensing camera of FIG. 7A, in accordance with aspects of the disclosure.

FIG. 7B illustrates an example layer arrangement of hybrid event sensing camera 700, in accordance with implementations of the disclosure. In FIG. 7B, image pixel array 702 is the top layer configured to receive incident image light 799. Layer 731 is disposed between layer 741 and image pixel array 702. Event-sensing logic 730 may be included in layer 731 and ROI logic 740 may be included in layer 741.

FIG. 7B illustrates 36 example imaging pixels in image pixel array 702 for explanation purposes. FIG. 7B includes eight shaded pixels that represent a triggered event pixel that generate event signals whereas the unshaded pixels represent silent pixels where an event signal has not been triggered.

Figure 7C:
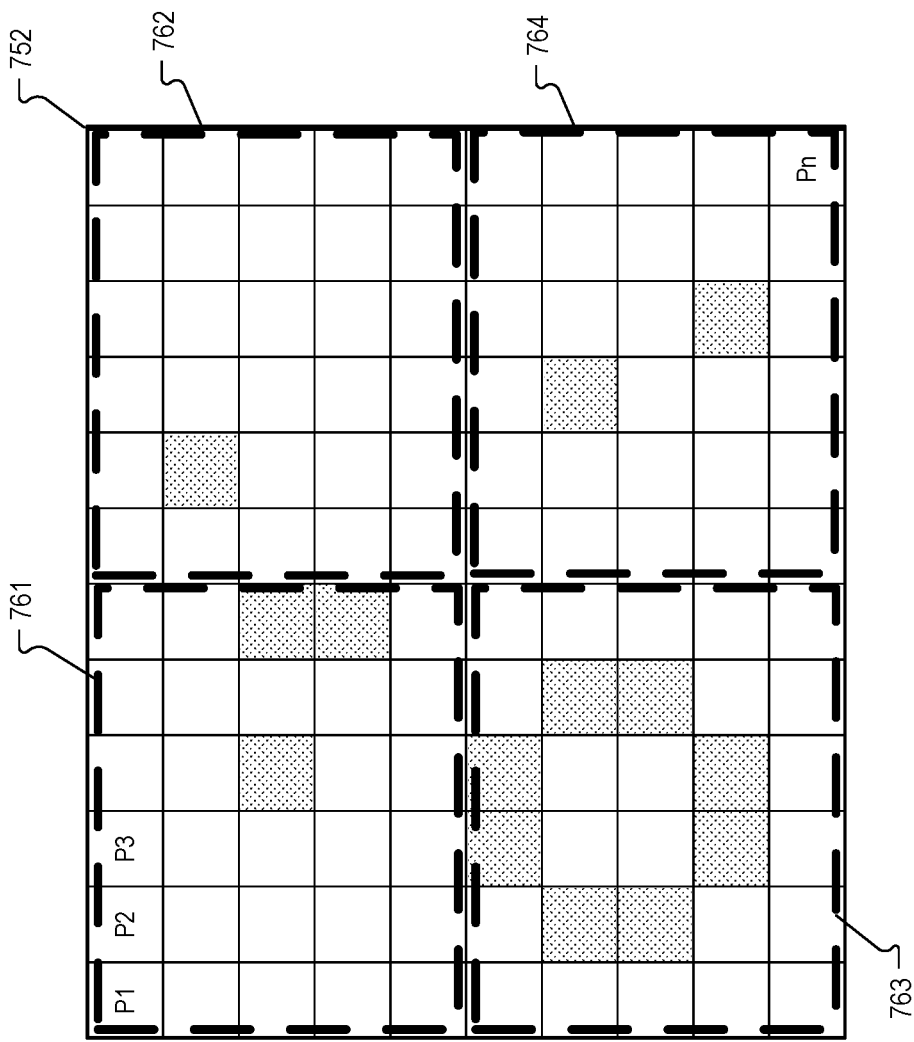
FIG. 7C illustrates an example image pixel array with various spatial concentrations in different regions of the image pixel array, in accordance with aspects of the disclosure.

FIG. 7C illustrates an example image pixel array 752 with various spatial concentrations in different regions of image pixel array 752, in accordance with implementations of the disclosure. Example image pixel array 752 includes regions 761, 762, 763, and 764. Regions 761, 762, 763, and 764 may correspond to quadrants of the image pixel array 752. Quadrant 761 includes three event triggered pixels, quadrant 762 includes one event triggered pixel, quadrant 763 includes eight event triggered pixels, and quadrant 764 includes two event triggered pixels. In some implementation, a particular region may be identified as a ROI when a spatial concentration of event triggered pixels is greater than a threshold percentage of the pixels in the region during a particular time period (e.g. 10 ms or less). In some implementations, the threshold percentage is 20% of the pixels are event triggered pixels. In this example, region 763 would be identified as an ROI since 26.6% (8 of 30) of the pixels are event triggered pixels. In other implementations, the threshold percentage is less than or greater than 20%.

All or a portion of the features of hybrid event sensing camera 700 may be implemented in hybrid event sensing camera 650 of head mounted device 600 in FIG. 6. Processing logic 699 may drive fringe illuminator module 140 and hybrid event sensing camera 700 to execute all or a portion of process 500 of FIG. 5. The image pixel array (image pixel array 702) of hybrid event sensing camera 700 may be used to capture images of the eyebox region, in accordance with implementations of process 500. In implementations utilizing head mounted device 100, the image pixel array of camera 155 may be used to capture images of the eyebox region, in accordance with implementations of process 500. In some implementations, the image pixel array of the head mounted device is configured to capture images of the eyebox region and initiating of the event tracking in process block 510, extracting the eye-features in process block 515, and generating the predicted gaze vector in process block 520 are executed between image captures of the image pixel array.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 199, processing logic 699, logic 720, logic 730, and/or logic 740) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
   a near-infrared illuminator module configured to illuminate an eyebox region with a fringe illumination pattern;
   an event sensor configured to generate event-signals, wherein the event-signals are generated from an imaging signal being above a positive event-threshold value or below a negative event-threshold value; and
   processing logic configured to:
      initiate event tracking in response to eye motion in the eyebox region reaching a threshold, wherein the eye motion is determined from the event-signals;
      extract eye-features from event-tracking data generated by the event sensors; and
      generate a predicted gaze vector from the eye-features.

2. The head mounted device of claim 1 further comprising:
a display configured to present virtual images to the eyebox region, wherein the processing logic is further configured to:
drive the display to present the virtual images to an eyebox location corresponding to the predicted gaze vector.

3. The head mounted device of claim 2, wherein the processing logic is further configured to:
extract an initial gaze and an initial pupil position; and
drive the display to present the virtual images to an initial eyebox location in response to the eye motion in the eyebox region failing to reach the threshold, wherein the initial eyebox location corresponds to the initial gaze and initial pupil position.

4. The head mounted device of claim 1 further comprising:
an image pixel array configured to capture images of the eyebox region, wherein (1) the initiating of the event tracking, (2) the extracting the eye-features, and (3) the generating the predicted gaze vector are executed between image captures of the image pixel array.

5. The head mounted device of claim 4, wherein the image pixel array is included in the event sensor, and wherein the image captures of the image pixel array are captured with a global shutter or a rolling shutter,
and further wherein the event sensor uses the image pixel array to capture the event-signals asynchronously.

6. The head mounted device of claim 4, wherein the image pixel array is co-located with the event sensor.

7. The head mounted device of claim 1, wherein the processing logic is further configured to:
compute a depth cloud of the eyebox region prior to initiating the event tracking, wherein generating the predicted gaze vector from the eye-features includes utilizing the depth cloud as a reference.

8. The head mounted device of claim 1, wherein the predicted gaze vector is predicted for a capture time of a future image capture of a camera of the head mounted device.

9. The head mounted device of claim 1, wherein the event-signals are generated by the event sensor while the eyebox region is illuminated by the fringe illumination pattern.

10. The head mounted device of claim 1, wherein the eye-features include at least one of a pupil or an iris.

11. The head mounted device of claim 1, wherein the event-signals are generated asynchronously.

12. The head mounted device of claim 1, wherein the fringe illumination pattern includes bright fringe strips alternating with dark fringe strips.

13. The head mounted device of claim 1 further comprising:
a camera co-located with the event sensor, wherein the camera is configured to image the eyebox region.

14. A head mounted device comprising:
a near-infrared illuminator module configured to illuminate an eyebox region;
an event sensor configured to generate event-signals; and
processing logic configured to:
compute a depth cloud of the eyebox region;
initiate event tracking in response to eye motion in the eyebox region reaching a threshold, wherein the eye motion is determined from the event-signals;
extract eye-features from event-tracking data generated by the event sensors; and
generate a predicted gaze vector from the eye-features, wherein generating the predicted gaze vector from the eye-features includes utilizing the depth cloud as a reference.

15. The head mounted device of claim 14, wherein the event-signals are generated asynchronously.

16. A head mounted device comprising:
a near-infrared illuminator module configured to illuminate an eyebox region;
an event sensor configured to generate event-signals;
an image pixel array configured to capture images of the eyebox region; and
processing logic configured to:
initiate event tracking in response to eye motion in the eyebox region reaching a threshold, wherein the eye motion is determined from the event-signals;
extract eye-features from event-tracking data generated by the event sensors; and
generate a predicted gaze vector from the eye-features, wherein the initiating of the event tracking, the extracting the eye-features, and the generating the predicted gaze vector are executed between image captures of the image pixel array.

17. The head mounted device of claim 16, wherein the event-signals are generated asynchronously.

* * * * *